United States Patent
Yano et al.

(10) Patent No.: US 11,618,967 B2
(45) Date of Patent: Apr. 4, 2023

(54) PRODUCTION METHOD FOR STAINLESS STEEL SHEET FOR FUEL CELL SEPARATORS

(71) Applicant: JFE STEEL CORPORATION, Tokyo (JP)

(72) Inventors: Takayoshi Yano, Tokyo (JP); Shin Ishikawa, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 408 days.

(21) Appl. No.: 16/649,984

(22) PCT Filed: Sep. 27, 2018

(86) PCT No.: PCT/JP2018/036111
§ 371 (c)(1),
(2) Date: Mar. 24, 2020

(87) PCT Pub. No.: WO2019/082591
PCT Pub. Date: May 2, 2019

(65) Prior Publication Data
US 2020/0248332 A1    Aug. 6, 2020

(30) Foreign Application Priority Data

Oct. 25, 2017  (JP) .............................. JP2017-206429
Apr. 19, 2018  (JP) .............................. JP2018-080901

(51) Int. Cl.
*C25F 3/06*    (2006.01)
*C23C 22/50*   (2006.01)
*H01M 8/021*   (2016.01)

(52) U.S. Cl.
CPC ............... *C25F 3/06* (2013.01); *C23C 22/50* (2013.01); *H01M 8/021* (2013.01)

(58) Field of Classification Search
CPC .......... C25F 3/06; C23C 22/50; H01M 8/021
See application file for complete search history.

(56) References Cited

U.S. PATENT DOCUMENTS

| 7,070,877 B2 | 7/2006 | Morita et al. |
| 8,440,029 B2 | 5/2013 | Ide et al. |
| 8,828,258 B2 | 9/2014 | Jeon et al. |

(Continued)

FOREIGN PATENT DOCUMENTS

| CN | 1776029 A   | 5/2006 |
| CN | 101210343 A | 7/2008 |

(Continued)

OTHER PUBLICATIONS

English machine translation of Fuji et al (JP 2012201950 A1) (Year: 2012).*

(Continued)

*Primary Examiner* — Brian R Ohara
*Assistant Examiner* — Aaron J Salter
(74) *Attorney, Agent, or Firm* — Kenja IP Law PC (57) ABSTRACT

A production method for a stainless steel sheet for fuel cell separators comprises: preparing a stainless steel sheet as a material; thereafter removing an oxide layer at a surface of the stainless steel sheet; and thereafter subjecting the stainless steel sheet to electrolytic etching treatment in an active region of the stainless steel sheet.

18 Claims, 3 Drawing Sheets

(56) References Cited

U.S. PATENT DOCUMENTS

| | | | |
|---|---|---|---|
| 9,531,014 B2 | 12/2016 | Nagoshi et al. | |
| 9,587,297 B2 | 3/2017 | Ishii et al. | |
| 9,653,738 B2 | 5/2017 | Ide et al. | |
| 2003/0224236 A1* | 12/2003 | Morita | H01M 8/021 429/508 |
| 2009/0226785 A1 | 9/2009 | Kihira et al. | |
| 2010/0035115 A1* | 2/2010 | Takagi | H01M 8/0206 420/49 |
| 2014/0154129 A1 | 6/2014 | Makiishi et al. | |
| 2014/0272668 A1 | 9/2014 | Nagoshi et al. | |
| 2020/0340126 A1* | 10/2020 | Yano | C22C 38/50 |
| 2022/0085388 A1* | 3/2022 | Yano | C22C 38/001 |

FOREIGN PATENT DOCUMENTS

| | | | | |
|---|---|---|---|---|
| CN | 103314475 A | | 9/2013 | |
| JP | H0254796 A | | 2/1990 | |
| JP | H-0254796 A | * | 2/1990 | C25D 11/34 |
| JP | H08180883 A | | 7/1996 | |
| JP | 2002151096 A | | 5/2002 | |
| JP | 2002367622 A | | 12/2002 | |
| JP | 2003003300 A | | 1/2003 | |
| JP | 2003297379 A | | 10/2003 | |
| JP | 2004265694 A | | 9/2004 | |
| JP | 2008091225 A | | 4/2008 | |
| JP | 2010525522 A | | 7/2010 | |
| JP | 2012201950 A | * | 10/2012 | |
| JP | 2013093299 A | | 5/2013 | |
| JP | 5218612 B2 | | 6/2013 | |
| JP | 5768641 B2 | | 8/2015 | |
| WO | 2011013832 A1 | | 2/2011 | |
| WO | 2012098689 A1 | | 7/2012 | |
| WO | 2013080533 A1 | | 6/2013 | |

OTHER PUBLICATIONS

English machine translation of Nakayama et al. (JPH 0254796 A) (Year: 1990).*

Jan. 8, 2019, International Search Report issued in the International Patent Application No. PCT/JP2018/036111.

D. M. Allen et al., Surface textures and process characteristics of the electrolytic photoetching of annealed AISI 304 stainless steel in hydrochloric acid, Precision Engineering, Apr. 1983, pp. 51-56, vol. 5, No. 2.

EURO INOX, Pickling and Passivating Stainless Steel Materials and Applications Series, vol. 4, Dec. 31, 2004, Retrieved from the Internet: URL:http://www.worldstainless.org/Files/issf/non-image-files/PDF/Euro_Inox/Passivating_Pickling_EN.pdf, [retrieved on Mar. 22, 2019].

Oct. 21, 2020, the Extended European Search Report issued by the European Patent Office in the corresponding European Patent Application No. 18870953.9.

Oct. 6, 2021, Office Action issued by the Korean Intellectual Property Office in the corresponding Korean Patent Application No. 10-2020-7013698 with English language concise statement of relevance.

Aug. 19, 2022, Office Action issued by the China National Intellectual Property Administration in the corresponding Chinese Patent Application No. 201880069009.4 with English language search report.

* cited by examiner

PRODUCTION METHOD FOR STAINLESS STEEL SHEET FOR FUEL CELL SEPARATORS

TECHNICAL FIELD

The present disclosure relates to a production method for a stainless steel sheet for fuel cell separators.

BACKGROUND

In recent years, fuel cells that have excellent power generation efficiency and emit no carbon dioxide are being developed for global environment protection. Such a fuel cell generates electricity from hydrogen and oxygen through an electrochemical reaction. The fuel cell has a sandwich-like basic structure, and includes an electrolyte membrane (ion-exchange membrane), two electrodes (fuel electrode and air electrode), gas diffusion layers of $O_2$ (air) and $H_2$, and two separators (bipolar plates).

Fuel cells are classified as phosphoric acid fuel cells, molten carbonate fuel cells, solid oxide fuel cells, alkaline fuel cells, and polymer electrolyte fuel cells (PEFC: proton-exchange membrane fuel cells or polymer electrolyte fuel cells) according to the type of electrolyte membrane used, which are each being developed.

Of these fuel cells, polymer electrolyte fuel cells are particularly expected to be used as power sources in electric vehicles, home or industrial stationary generators, and portable small generators.

A polymer electrolyte fuel cell extracts electricity from hydrogen and oxygen via a polymer membrane. A membrane-electrode joined body is sandwiched between gas diffusion layers (for example, carbon paper) and separators, forming a single component (a single cell). An electromotive force is generated between the separator on the fuel electrode side and the separator on the air electrode side.

The membrane-electrode joined body is called a membrane-electrode assembly (MEA). The membrane-electrode joined body is an assembly of a polymer membrane and an electrode material such as carbon black carrying a platinum catalyst on the front and back surfaces of the membrane, and has a thickness of several 10 µm to several 100 µm. The gas diffusion layers are often integrated with the membrane-electrode joined body.

In the case of actually using polymer electrolyte fuel cells, several tens to hundreds of single cells such as the above are typically connected in series to form a fuel cell stack and put to use.

The separators are required to function not only as
(a) partition walls separating single cells,
but also as
(b) conductors carrying generated electrons,
(c) air passages through which oxygen (air) flows and hydrogen passages through which hydrogen flows, and
(d) exhaust passages through which generated water or gas is exhausted (the air passages or the hydrogen passages also serve as the exhaust passages).

The separators therefore need to have excellent durability and electric conductivity.

The durability depends on corrosion resistance. This is because, if metal ions are eluted due to separator corrosion, the proton conductivity of the polymer membrane (electrolyte membrane) decreases and the power generation performance decreases.

Regarding electric conductivity (conductivity), the contact resistance between the separator and the gas diffusion layer is desirably as low as possible, because an increase in the contact resistance between the separator and the gas diffusion layer causes lower power generation efficiency of the polymer electrolyte fuel cell. A lower contact resistance between the separator and the gas diffusion layer contributes to better power generation performance.

Polymer electrolyte fuel cells using graphite as separators have already been in practical use. The separators made of graphite are advantageous in that the contact resistance is relatively low and also corrosion does not occur. The separators made of graphite, however, easily break on impact, and so are disadvantageous in that the size reduction is difficult and the processing cost for forming gas flow passages is high. These drawbacks of the separators made of graphite hinder the widespread use of polymer electrolyte fuel cells.

Attempts have been made to use a metal material as the separator material instead of graphite. In particular, various studies have been conducted to commercialize separators made of stainless steel, titanium, a titanium alloy, or the like for enhanced durability.

For example, JP H8-180883 A (PTL 1) discloses a technique of using, as separators, a metal such as stainless steel or a titanium alloy that easily forms a passive film.

With the technique disclosed in PTL 1, however, the formation of the passive film causes an increase in contact resistance, and leads to lower power generation efficiency. The metal material disclosed in PTL 1 thus has problems such as high contact resistance as compared with the graphite material.

To reduce contact resistance, for example, JP 5768641 B2 (PTL 2) discloses a "ferritic stainless steel with excellent corrosion resistance and electric conductivity, containing, in mass %, C: 0.001% to 0.05%, Si: 0.001% to 0.5%, Mn: 0.001% to 1.0%, Al: 0.001% to 0.5%, N: 0.001% to 0.05%, Cr: 17% to 23%, and Mo: 0.1% or less with the balance consisting of Fe and inevitable impurities, and having, at a surface thereof, a layer obtained by immersion in an immersion solution that is mainly made of hydrofluoric acid or hydrofluoric nitric acid and satisfies a relationship [HF]≥[HNO$_3$] . . . [1], where [HF] represents a concentration of hydrofluoric acid and [HNO$_3$] represents a concentration of nitric acid".

JP 2013-93299 A (PTL 3) discloses a "method of producing stainless steel for fuel cell separators, comprising: subjecting stainless steel containing 16 mass % or more Cr to electrolysis; and then immersing the stainless steel in a fluorine-containing solution".

JP 5218612 B2 (PTL 4) discloses a "stainless steel for fuel cell separators, containing, in mass %, C: 0.03% or less, Si: 1.0% or less, Mn: 1.0% or less, S: 0.01% or less, P: 0.05% or less, Al: 0.20% or less, N: 0.03% or less, and Cr: 16% to 40%, and one or more selected from Ni: 20% or less, Cu: 0.6% or less, and Mo: 2.5% or less, with the balance consisting of Fe and inevitable impurities, wherein in the case where a surface of the stainless steel is measured by photoelectron spectroscopy, F is detected, and ((Cr+Fe) in chemical form other than metal)/((Cr+Fe) in metal form)≥3.0".

WO 2013/080533 A1 (PTL 5) discloses a "stainless steel for fuel cell separators with low surface contact resistance, containing 16 mass % to 40 mass % Cr, and including a region having a fine textured structure at a surface thereof, an area ratio of the region being 50% or more".

CITATION LIST

Patent Literatures

PTL 1: JP H8-180883 A
PTL 2: JP 5768641 B2
PTL 3: JP 2013-93299 A
PTL 4: JP 5218612 B2
PTL 5: WO 2013/080533 A1

SUMMARY

Technical Problem

However, when, for mass production of each of the stainless steel sheets disclosed in PTL 2 to PTL 5, immersion in a hydrofluoric acid-containing treatment solution is continuously performed as etching treatment, the etching performance of the hydrofluoric acid may decrease due to Fe ions and the like eluted from the steel sheet as the material to be treated, making it impossible to achieve desired contact resistance reduction effect stably.

Moreover, a hydrofluoric acid-containing treatment solution has extremely high chemical activity, which causes a safety problem during treatment. Disposal of waste liquid discharged after treatment also causes a safety problem.

It could therefore be helpful to provide a production method for a stainless steel sheet for fuel cell separators whereby a stainless steel sheet for fuel cell separators achieving low contact resistance can be produced more advantageously in terms of mass productivity and safety without using hydrofluoric acid.

Solution to Problem

We conducted extensive examination to solve the problems stated above.

First, we attempted electrolytic etching treatment using various treatment solutions, as an alternative to immersion in a hydrofluoric acid-containing treatment solution.

We consequently discovered that the contact resistance reduction effect differs depending on the electrolytic potential in the electrolytic etching treatment. Specifically, we discovered that the contact resistance reduction effect is most favorable in the case of performing electrolytic etching treatment in the active region of the stainless steel sheet.

As a result of conducting further examination, we discovered that the effect of the electrolytic etching treatment in the active region is achieved more stably by removing, prior to the electrolytic etching treatment, an oxide layer formed on the steel sheet beforehand (specifically, a passive film formed in air, a BA layer formed during bright annealing in steel sheet production, or the like), and combining these features has approximately as much contact resistance reduction effect as immersion in a hydrofluoric acid-containing treatment solution.

Furthermore, when each of the stainless steel sheets disclosed in PTL 2 to PTL 5 is actually used as a fuel cell separator, the contact resistance may not be reduced as much as expected at the stage of the material steel sheet, making it impossible to achieve desired power generation performance.

We conducted further examination on this point, and discovered that, by subjecting the stainless steel sheet to surface stabilizing treatment after the electrolytic etching treatment, the contact resistance can be further reduced, and approximately as much contact resistance reduction effect as expected at the stage of the material steel sheet is reliably maintained in the case of actually using the stainless steel sheet as a fuel cell separator.

The present disclosure is based on these discoveries and further studies.

We thus provide:

1. A production method for a stainless steel sheet for fuel cell separators, the production method comprising: preparing a stainless steel sheet as a material; thereafter removing an oxide layer at a surface of the stainless steel sheet; and thereafter subjecting the stainless steel sheet to electrolytic etching treatment in an active region of the stainless steel sheet.

2. The production method for a stainless steel sheet for fuel cell separators according to 1., wherein the oxide layer at the surface of the stainless steel sheet is removed by electrolysis.

3. The production method for a stainless steel sheet for fuel cell separators according to 2., wherein the electrolysis is cathodic electrolysis.

4. The production method for a stainless steel sheet for fuel cell separators according to any of 1. to 3., comprising subjecting the stainless steel sheet to surface stabilizing treatment, after the electrolytic etching treatment.

5. The production method for a stainless steel sheet for fuel cell separators according to 4., wherein the surface stabilizing treatment is immersion in an oxidizing solution or electrolysis in a passive region of the stainless steel sheet.

6. The production method for a stainless steel sheet for fuel cell separators according to any of 1. to 5., wherein a treatment solution used in the electrolytic etching treatment is a sulfuric acid aqueous solution, a hydrochloric acid aqueous solution, or a mixed aqueous solution of sulfuric acid and hydrochloric acid.

Advantageous Effect

It is thus possible to produce a stainless steel sheet for fuel cell separators achieving low contact resistance more advantageously in terms of mass productivity and safety without using a hydrofluoric acid-containing treatment solution.

A stainless steel sheet for fuel cell separators produced by the production method according to the present disclosure can maintain low contact resistance even in the case of being exposed to a heat treatment environment in a fuel cell stack production process, and therefore is very advantageous in practical use.

DETAILED DESCRIPTION

A production method for a stainless steel sheet for fuel cell separators according to one of the disclosed embodiments will be described below.

(1) Preparation of Stainless Steel Sheet as Material

This process involves preparing a stainless steel sheet as a material. The stainless steel sheet as a material is not limited.

For example, a stainless steel sheet having a chemical composition described later can be prepared by hot rolling a steel slab having the chemical composition to obtain a hot-rolled sheet, optionally subjecting the hot-rolled sheet to hot-rolled sheet annealing, thereafter cold rolling the hot-rolled sheet to obtain a cold-rolled sheet with a desired sheet thickness, and further optionally subjecting the cold-rolled sheet to cold-rolled sheet annealing.

The conditions of the hot rolling, the cold rolling, the hot-rolled sheet annealing, the cold-rolled sheet annealing, and the like are not limited, and may comply with conventional methods. After the cold-rolled sheet annealing, the stainless steel sheet may be subjected to pickling and skin pass. A stainless steel sheet prepared by bright annealing instead of cold-rolled sheet annealing may also be used.

The chemical composition of the stainless steel sheet prepared is not limited, but the stainless steel sheet preferably has a chemical composition containing, in mass %, C: 0.100% or less, Si: 2.00% or less, Mn: 2.00% or less, P: 0.050% or less, S: 0.010% or less, Cr: 11.0% to 40.0%, Al: 0.500% or less, and N: 0.100% or less with the balance consisting of Fe and inevitable impurities.

The reasons for this will be explained below. In the following description, "%" regarding components denotes mass % unless otherwise stated.

C: 0.100% or less

C reacts with Cr in the stainless steel and precipitates as Cr carbide in grain boundaries, thus causing a decrease in corrosion resistance. Therefore, less C is desirable in terms of corrosion resistance, and the C content is preferably 0.100% or less. The C content is more preferably 0.030% or less. The C content is further preferably 0.020% or less. No lower limit is placed on the C content, yet the lower limit is preferably about 0.001%.

Si: 2.00% or less

Si is an element effective for deoxidation, and is added at the stage of steelmaking for the stainless steel. To achieve this effect, the Si content is preferably 0.01% or more. Excessively containing Si, however, hardens the stainless steel, as a result of which ductility tends to decrease. Therefore, the Si content is preferably 2.00% or less. The Si content is more preferably 0.60% or less.

Mn: 2.00% or less

Mn is an element effective for deoxidation, and is added at the stage of steelmaking for the stainless steel. To achieve this effect, the Mn content is preferably 0.01% or more. If the Mn content is more than 2.00%, corrosion resistance tends to decrease. Therefore, the Mn content is preferably 2.00% or less. The Mn content is more preferably 1.50% or less, and further preferably 1.00% or less.

P: 0.050% or less

P decreases ductility, and thus the P content is desirably low. If the P content is 0.050% or less, ductility does not decrease markedly. Therefore, the P content is preferably 0.050% or less. The P content is more preferably 0.040% or less. No lower limit is placed on the P content, yet the lower limit is preferably about 0.010% because excessive dephosphorization incurs higher cost.

S: 0.010% or less

S is an element that combines with Mn to form MnS and thus decreases corrosion resistance. If the S content is 0.010% or less, corrosion resistance does not decrease markedly. Therefore, the S content is preferably 0.010% or less. No lower limit is placed on the S content, yet the lower limit is preferably about 0.001% because excessive desulfurization incurs higher cost.

Cr: 11.0% to 40.0%

The Cr content is preferably 11.0% or more in order to ensure corrosion resistance. If the Cr content is less than 11.0%, the stainless steel sheet may have difficulty in withstanding long-term use as fuel cell separators in terms of corrosion resistance. The Cr content is preferably 16.0% or more. If the Cr content is more than 40.0%, toughness may decrease due to precipitation of σ phase. Therefore, the Cr content is preferably 40.0% or less. The Cr content is more preferably 32.0% or less.

Al: 0.500% or less

Al is an element used for deoxidation. To achieve this effect, the Al content is preferably 0.001% or more. If the Al content is more than 0.500%, ductility may decrease. Therefore, the Al content is preferably 0.500% or less. The Al content is more preferably 0.150% or less, and further preferably 0.100% or less.

N: 0.100% or less

If the N content is more than 0.100%, formability decreases. Therefore, the N content is preferably 0.100% or less. The N content is more preferably 0.030% or less. The N content is further preferably 0.020% or less. No lower limit is placed on the N content, yet the lower limit is preferably about 0.002% because excessive denitriding incurs higher cost.

While the basic components have been described above, the stainless steel sheet for fuel cell separators may further contain the following components in addition to the basic components.

Ni: 30.00% or less

Ni is an element effective for improving the corrosion resistance of the stainless steel. Austenitic stainless steel or ferrite-austenite dual phase stainless steel typically contains a certain amount of Ni. If the Ni content is more than 30.00%, hot workability decreases. Accordingly, in the case of containing Ni, the Ni content is 30.00% or less. The Ni content is preferably 15.00% or less. The lower limit of the Ni content in austenitic stainless steel or ferrite-austenite dual phase stainless steel is preferably 2.00%.

In the case of containing Ni in ferritic stainless steel, the Ni content is preferably 4.00% or less. The Ni content is more preferably 1.00% or less. The lower limit of the Ni content in ferritic stainless steel is preferably 0.01%.

Cu: 2.50% or less

Cu is an element effective for improving the corrosion resistance of the stainless steel. To achieve this effect, the Cu content is preferably 0.01% or more. If the Cu content is more than 2.50%, hot workability decreases, which leads to a decrease in productivity. Accordingly, in the case of containing Cu, the Cu content is 2.50% or less. The Cu content is preferably 1.00% or less.

Mo: 4.00% or less

Mo is an element effective for preventing local corrosion such as crevice corrosion of the stainless steel. To achieve this effect, the Mo content is preferably 0.01% or more. If the Mo content is more than 4.00%, the stainless steel embrittles. Accordingly, in case of containing Mo, the Mo content is 4.00% or less. The Mo content is preferably 2.50% or less.

One or more elements selected from Ti, Nb, and Zr: 1.00% or less in total

Ti, Nb, and Zr contribute to improved intergranular corrosion resistance, and therefore these elements can be contained alone or in combination. To achieve this effect, the content of each element is preferably 0.01% or more. If the total content of these elements is more than 1.00%, however, ductility tends to decrease. Accordingly, in the case of containing any of Ti, Nb, and Zr, the total content of these elements is 1.00% or less. No lower limit is placed on the total content of Ti, Nb, and Zr, yet the lower limit is preferably 0.01%.

The components other than those described above are Fe and inevitable impurities.

In terms of the fuel cell stack installation space and weight, the sheet thickness of the stainless steel sheet is preferably in a range of 0.03 mm to 0.30 mm. If the sheet thickness is less than 0.03 mm, the production efficiency of the metal sheet material decreases. If the sheet thickness is more than 0.30 mm, the stack installation space and weight increase. The sheet thickness is more preferably 0.03 mm or more. The sheet thickness is more preferably 0.10 mm or less.

(2) Removal of Oxide Layer

Prior to the below-described electrolytic etching treatment, an oxide layer formed at the surface of the prepared stainless steel sheet beforehand (hereafter also simply referred to as "oxide layer") is removed to achieve stable contact resistance reduction effect by the electrolytic etching treatment in the active region.

The oxide layer formed beforehand is, for example, a passive film formed in air or a BA layer formed during bright annealing in the production of the stainless steel sheet as a material.

The oxide layer may be removed by anodic electrolysis, cathodic electrolysis, or a combination of anodic electrolysis and cathodic electrolysis. Of these, cathodic electrolysis is preferable. Cathodic electrolysis is particularly advantageous because the amount of the base metal of the stainless steel sheet dissolved is reduced as compared with anodic electrolysis.

The treatment conditions of cathodic electrolysis are set to have such current density that can remove the oxide layer at the surface of the stainless steel sheet. Specifically, the electrolysis conditions are preferably adjusted in each case depending on the steel type of the stainless steel sheet, the thickness of the oxide layer formed beforehand, and the structure of the electrolysis apparatus, etc.

For example, in the case of potential control, cathodic electrolysis can be performed under the conditions of potential: −0.7 V (vs. Ag/AgCl) and treatment time: 1 min or more in a 30 g/L sulfuric acid aqueous solution. Herein, V (vs. Ag/AgCl) is the potential relative to a silver-silver chloride electrode used as a reference electrode, which is expressed as (vs. Ag/AgCl).

In the case of current control, the conditions are preferably adjusted in a range of current density: −0.1 mA/cm$^2$ to −100 mA/cm$^2$ and treatment time: 1 sec to 600 sec, although depending on the steel type and the thickness of the oxide layer. In particular, while the treatment time depends on the current density, for example in the case of current density: −0.5 mA/cm$^2$, the oxide layer at the surface of the stainless steel sheet is typically removed with a treatment time of 60 sec or more. If the treatment time increases, economic efficiency decreases. The treatment time is therefore preferably 600 sec or less. The treatment time is more preferably 300 sec or less.

The "current density" herein denotes a value obtained by dividing the current flowing between the stainless steel sheet as the material to be treated and the counter electrode by the surface area of the material to be treated. In current control, this current density is controlled.

The treatment solution used in the cathodic electrolysis is not limited. Examples include a sulfuric acid aqueous solution, a hydrochloric acid aqueous solution, and a mixed aqueous solution of sulfuric acid and hydrochloric acid. Of these, a sulfuric acid aqueous solution is preferable.

The concentration of the treatment solution is adjusted so that the treatment solution has sufficiently high conductivity. For example, in the case of a sulfuric acid aqueous solution, the concentration of sulfuric acid is preferably about 10 g/L to 100 g/L. In the case of a hydrochloric acid aqueous solution, the concentration of hydrochloric acid is preferably about 10 g/L to 100 g/L. In the case of a mixed aqueous solution of sulfuric acid and hydrochloric acid, the concentration of sulfuric acid and the concentration of hydrochloric acid are each preferably about 10 g/L to 100 g/L.

The treatment solution may contain a small amount of nitric acid. The concentration of nitric acid is preferably 10 g/L or less. The concentration of nitric acid may be 0 g/L.

Acids other than the foregoing sulfuric acid, hydrochloric acid, and nitric acid are preferably reduced as much as possible. When using an inexpensive acid such as a regenerated acid, however, other acids such as hydrofluoric acid and phosphoric acid are contained as impurities in some cases. Allowable concentration of acids other than sulfuric acid, hydrochloric acid, and nitric acid is 5 g/L or less. Here, the concentration of hydrofluoric acid needs to be infinitesimal, specifically 1 g/L or less, in terms of safety during treatment and safety of disposal of waste liquid discharged after treatment. The concentration of acids other than sulfuric acid, hydrochloric acid, and nitric acid may be 0 g/L.

Thus, the terms "sulfuric acid aqueous solution", "hydrochloric acid aqueous solution", and "mixed aqueous solution of sulfuric acid and hydrochloric acid" herein respectively include a sulfuric acid aqueous solution, a hydrochloric acid aqueous solution, and a mixed aqueous solution of sulfuric acid and hydrochloric acid each containing 10 g/L or less of nitric acid and/or 5 g/L or less of acids other than sulfuric acid, hydrochloric acid, and nitric acid. The terms "sulfuric acid aqueous solution", "hydrochloric acid aqueous solution", and "mixed aqueous solution of sulfuric acid and hydrochloric acid" herein denote only solutions in which the concentration of hydrofluoric acid is 1 g/L or less.

The treatment temperature is not limited, but is preferably 30° C. to 85° C.

Using the same treatment solution for the oxide layer removal and the below-described electrolytic etching treatment is advantageous cost-wise. Moreover, the oxide layer removal and the electrolytic etching treatment can be continuously performed in the same electrolytic bath, depending on the structure of the electrolytic bath.

(3) Electrolytic Etching Treatment

The stainless steel sheet from which the oxide layer at the surface has been removed by the foregoing oxide layer removal treatment is subjected to electrolytic etching treatment in the active region of the stainless steel sheet. This produces at least as much contact resistance reduction effect as immersion in a hydrofluoric acid-containing treatment solution.

We consider the reason for this to be the following.

Electrolysis of a stainless steel sheet is performed in any of three potential ranges: an active region, a passive region, and a transpassive region.

Figure 1:
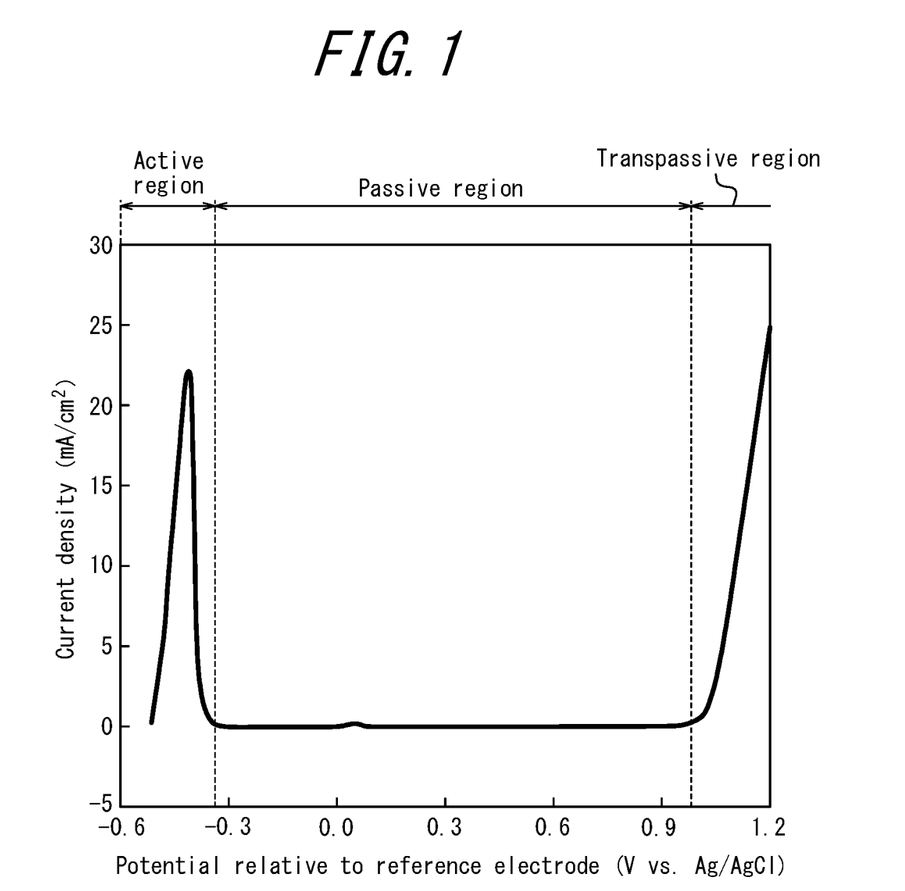
FIG. 1 is a diagram illustrating an example of an anodic polarization curve.

Specifically, as illustrated in FIG. 1, in the case where a stainless steel sheet having the chemical composition of steel sample ID A in Table 1 is polarized in an anodic direction from a natural immersion potential, the current, i.e. the current density, increases from when the potential exceeds −0.51 V (vs. Ag/AgCl), and reaches a local maximum value of about +22.0 mA/cm$^2$. After this, the current decreases as the potential increases, and, when the potential reaches −0.34 V (vs. Ag/AgCl), the current density decreases to less than or equal to 1/100 of the local maximum value. This low current state continues in a potential range from −0.34 V (vs. Ag/AgCl) to +0.97 V (vs. Ag/AgCl). After this, the current density rapidly increases again as the potential increases.

FIG. 1 illustrates an anodic polarization curve obtained for steel sample ID A in Table 1 under the conditions of 55° C. and potential scanning rate: 1 mV/s in a 30 g/L sulfuric acid aqueous solution, using a silver-silver chloride electrode as a reference electrode. This potential scanning rate is used when obtaining an anodic polarization curve.

The potential range in which the current density increases with the initial potential increase is the active region, the potential range in which current hardly flows and the current density remains low even when the potential increases is the passive region, and the potential range in which the current density rapidly increases over the potential range of the passive region is the transpassive region.

Specifically, the active region is defined as a potential range that, in an anodic polarization curve obtained when polarizing a stainless steel sheet in a treatment solution in an anodic direction from a natural immersion potential at a scanning rate of 1 mV/s, appears first with potential increase (before the passive region is reached) and in which the current density increases as the potential increases and reaches a local maximum value (the maximum value of the current density in the active region) and then decreases to less than or equal to 1/100 of the local maximum value. In the case of austenitic stainless steel, the current value in the active region is very low, and accordingly the active region is defined as a potential range until the current density decreases to less than or equal to 1/2 of the local maximum value.

The passive region is defined as a potential range in which, in the anodic polarization curve, current hardly flows even when the potential increases over the active region (specifically, a potential range in which the current density is maintained at less than or equal to 1/100 of the local maximum value; in the case of austenitic stainless steel, a potential range in which the current density is maintained at less than or equal to 1/2 of the local maximum value).

The transpassive region is defined as a potential range in which the current rapidly increases as the potential increases over the passive region.

Since the flowing current value and the potential vary depending on the steel type and the electrolytic solution, an anodic polarization curve may be acquired in each case to determine the regions.

In the case where electrolytic etching treatment is performed in the passive region, a passive film is formed on the stainless steel sheet, so that the etching effect is insufficient and desired contact resistance reduction effect cannot be achieved.

In the case where electrolysis is performed in the transpassive region, the amount of the stainless steel sheet dissolved is large, and the dissolution rate is high. Consequently, etching progresses rapidly, and desired contact resistance reduction effect cannot be achieved. In addition, an oxygen evolution reaction can occur simultaneously depending on the potential, which makes it difficult to control the etching amount.

In the case where electrolytic etching treatment is performed in the active region, the etching effect is more sufficient than in the passive region. Moreover, the amount of the stainless steel dissolved is smaller and the dissolution amount is easier to control than in the transpassive region. Hence, the nonuniformity of the etching amount on the surface of the stainless steel sheet occurs, and as a result a fine textured shape is formed on the surface of the stainless steel sheet.

As a result of using such a stainless steel having a fine textured shape at its surface for a separator of a polymer electrolyte fuel cell, the contact area between the separator and the gas diffusion layer increases and the contact resistance decreases. The contact resistance reduction effect can be stably achieved by removing the oxide layer at the surface of the stainless steel sheet as the material before the electrolytic etching treatment, as mentioned earlier.

We consider that, by such synergistic effect of subjecting the stainless steel sheet from which the oxide layer at the surface has been removed to electrolytic etching treatment in the active region of the stainless steel sheet, as much contact resistance reduction effect as immersion in a hydrofluoric acid-containing treatment solution can be achieved.

The active region varies depending on the steel type of the stainless steel sheet, the treatment solution used, and the like. It is therefore preferable to acquire an anodic polarization curve in accordance with these conditions beforehand to determine the potential range of the active region and perform electrolytic etching treatment.

Specifically, in the case of performing electrolytic etching treatment by potential control, the anodic polarization curve of the stainless steel sheet as the material to be treated is acquired beforehand to determine the potential range of the active region and perform electrolytic etching treatment in the potential range.

For example, in the case of treating steel sample ID A in Table 1 in a 30 g/L sulfuric acid aqueous solution, a potential range of −0.51 V to −0.34 V (vs. Ag/AgCl) corresponds to the active region, and accordingly electrolytic etching is performed in the potential range of the active region with the treatment time adjusted in a range of 1 sec to 600 sec as appropriate.

In the case of performing electrolytic etching treatment by current control, the relationship between the current density and the electrolytic potential is studied beforehand to determine the range of current density in which the stainless steel sheet is electrolyzed in the active region and perform electrolytic etching in the range of current density.

In current control, adjustment is needed in each case because appropriate current density varies depending on the steel type of the stainless steel sheet, the treatment solution used, and the like.

For example, the relationship between the current density and the potential relative to the reference electrode during electrolysis is studied to determine current density with which the stainless steel sheet is electrolytically etched in the potential range of the active region illustrated in FIG. 1 and perform electrolytic etching treatment with the current density.

Figure 2:
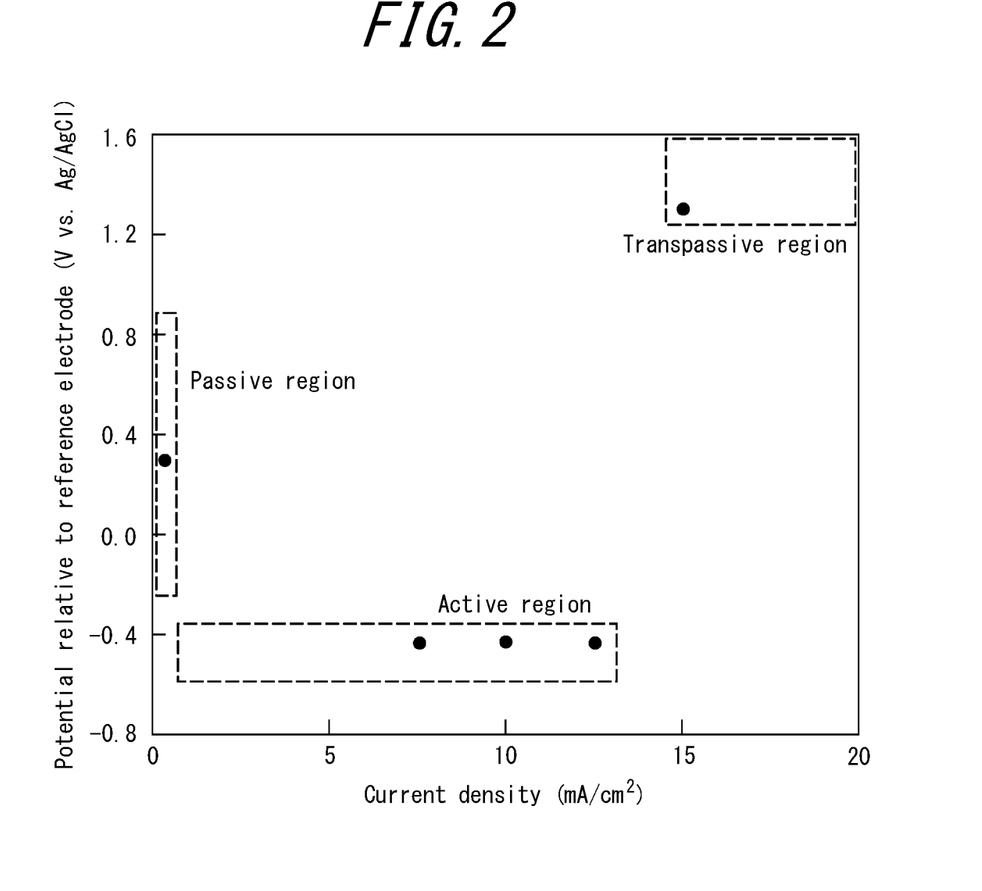
FIG. 2 is a diagram illustrating an example of the relationship between the current density and the potential relative to a reference electrode during electrolysis.

FIG. 2 illustrates an example of the relationship between the current density and the potential relative to the reference electrode during electrolysis. This is the relationship between the current density and the potential relative to the reference electrode during electrolysis for steel sample ID A in Table 1 in a 30 g/L sulfuric acid aqueous solution at 55° C.

As illustrated in the drawing, by controlling the current density to about 7.5 mA/cm² to 12.5 mA/cm², electrolytic etching treatment can be performed at or around −0.40 V (vs. Ag/AgCl) corresponding to the active region.

The "current density" herein denotes a value obtained by dividing the current flowing between the stainless steel sheet as the material to be treated and the counter electrode by the surface area of the material to be treated. In current control, this current density is controlled.

In a plant with a large-size electrolysis apparatus, such as when the material to be treated is large or a steel sheet in a coil state is subjected to electrolytic etching treatment, it is difficult to use a reference electrode. In such a case, the relationship between the current density and the electrolytic voltage applied between the stainless steel sheet as the material to be treated and the counter electrode may be studied while increasing the current density, to determine current density with which the stainless steel sheet is electrolytically etched in the potential range of the active region and perform electrolytic etching treatment with the current density.

For example, current density until the electrolytic voltage applied between the stainless steel sheet as the material to be treated and the counter electrode rapidly increases can be determined to correspond to the active region, and current density after the electrolytic voltage applied between the stainless steel sheet as the material to be treated and the counter electrode rapidly increases can be determined to correspond to the transpassive region.

Figure 3:
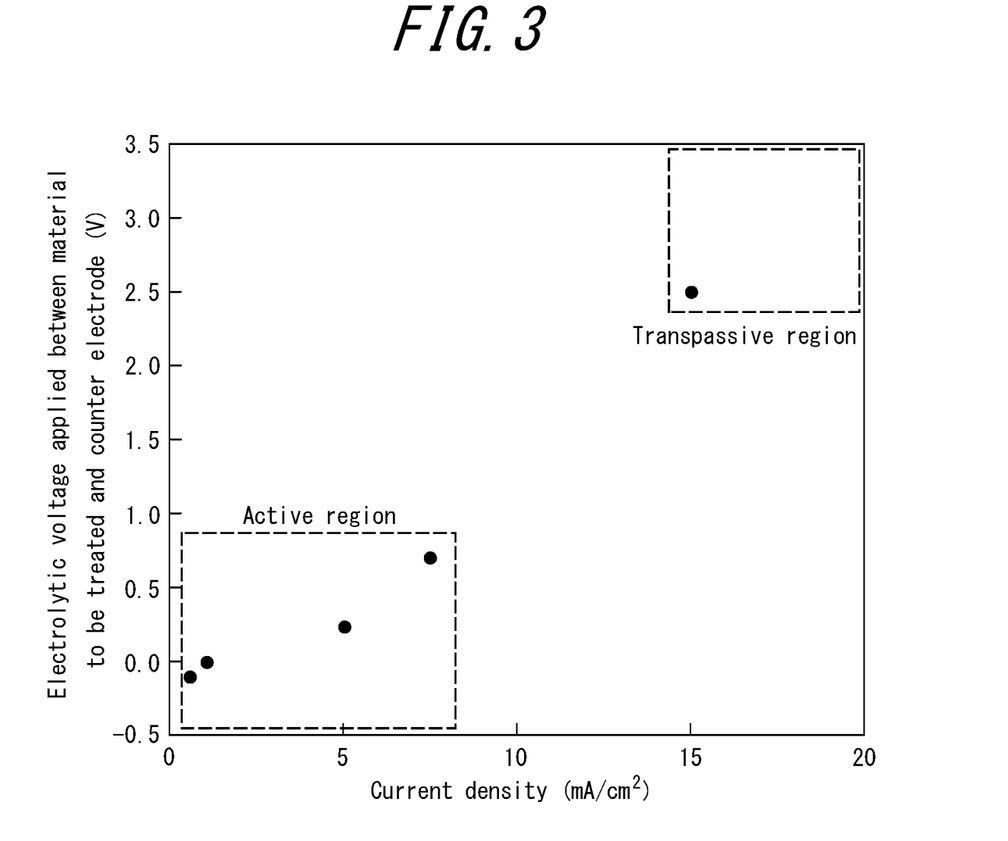
FIG. 3 is a diagram illustrating an example of the relationship between the current density and the electrolytic voltage applied between a material to be treated and a counter electrode during electrolysis.

FIG. 3 illustrates an example of the relationship between the current density and the electrolytic voltage applied between the stainless steel sheet as the material to be treated and the counter electrode during electrolysis. This is a result of studying the relationship between the current density and the electrolytic voltage applied between the stainless steel sheet as the material to be treated and the counter electrode during electrolysis for steel sample ID A in Table 1 in a 30 g/L sulfuric acid aqueous solution at 5° C. Since the electrolytic voltage rapidly increases when the current density is in a range of +7.5 mA/cm² to +15.0 mA/cm², current density adjusted to about +0.5 mA/cm² to +7.5 mA/cm² (preferably about +0.5 mA/cm² to +1.0 mA/cm²) can be determined to correspond to the active region, and current density adjusted to about +15.0 mA/cm² or more can be determined to correspond to the transpassive region.

The treatment time is adjusted in a range of 1 sec to 600 sec as appropriate.

The "current density" herein denotes a value obtained by dividing the current flowing between the stainless steel sheet as the material to be treated and the counter electrode by the surface area of the material to be treated. In current control, this current density is controlled.

The treatment solution used in the electrolytic etching treatment is preferably a sulfuric acid aqueous solution, a hydrochloric acid aqueous solution, or a mixed aqueous solution of sulfuric acid and hydrochloric acid. As a result of using these treatment solutions, sufficient etching effect can be achieved. Of these, a sulfuric acid aqueous solution is preferable.

The concentration of the treatment solution is adjusted so that the treatment solution has sufficiently high conductivity. For example, in the case of a sulfuric acid aqueous solution, the concentration of sulfuric acid is preferably about 10 g/L to 100 g/L. In the case of a hydrochloric acid aqueous solution, the concentration of hydrochloric acid is preferably about 10 g/L to 100 g/L. In the case of a mixed aqueous solution of sulfuric acid and hydrochloric acid, the concentration of sulfuric acid and the concentration of hydrochloric acid are each preferably about 10 g/L to 100 g/L.

The treatment solution may contain a small amount of nitric acid, for purposes such as removal of smut formed at the surface of the stainless steel. However, nitric acid passivates the stainless steel and reduces the etching effect. Herein, smut is a mixture containing C, N, S, Fe, and Cr and attached to the surface of the stainless steel sheet when the stainless steel sheet is electrolyzed. The concentration of nitric acid is therefore preferably 10 g/L or less. The concentration of nitric acid is preferably less than or equal to the concentration of sulfuric acid in the case of a sulfuric acid aqueous solution, less than or equal to the concentration of hydrochloric acid in the case of a hydrochloric acid aqueous solution, and less than or equal to the concentration of sulfuric acid and hydrochloric acid in the case of a mixed aqueous solution of sulfuric acid and hydrochloric acid. The concentration of nitric acid may be 0 g/L.

Acids other than the foregoing sulfuric acid, hydrochloric acid, and nitric acid are preferably reduced as much as possible. When using an inexpensive acid such as a regenerated acid, however, other acids such as hydrofluoric acid and phosphoric acid are contained as impurities in some cases. Allowable concentration of acids other than sulfuric acid, hydrochloric acid, and nitric acid is 5 g/L or less. Here, the concentration of hydrofluoric acid needs to be infinitesimal, specifically 1 g/L or less, in terms of safety during treatment and safety of disposal of waste liquid discharged after treatment. The concentration of acids other than sulfuric acid, hydrochloric acid, and nitric acid may be 0 g/L.

Thus, the terms "sulfuric acid aqueous solution", "hydrochloric acid aqueous solution", and "mixed aqueous solution of sulfuric acid and hydrochloric acid" herein respectively include a sulfuric acid aqueous solution, a hydrochloric acid aqueous solution, and a mixed aqueous solution of sulfuric acid and hydrochloric acid each containing 10 g/L or less of nitric acid and/or 5 g/L or less of acids other than sulfuric acid, hydrochloric acid, and nitric acid. The terms "sulfuric acid aqueous solution", "hydrochloric acid aqueous solution", and "mixed aqueous solution of sulfuric acid and hydrochloric acid" herein denote only solutions in which the concentration of hydrofluoric acid is 1 g/L or less.

The treatment temperature is not limited, but is preferably 30° C. to 85° C.

In the case where the oxide layer removal treatment and the electrolytic etching treatment can be performed with the same treatment solution and the same treatment temperature, the stainless steel sheet may be continuously treated using the same electrolytic bath.

(4) Surface Stabilizing Treatment

The contact resistance of the stainless steel sheet can be reduced by performing the electrolytic etching treatment as described above. In the case where further reduction in contact resistance is desirable or heat treatment is expected to be performed in a fuel cell stack production process, the stainless steel sheet that has been subjected to the electrolytic etching treatment may be further subjected to surface stabilizing treatment. This dissolves and removes attached matter such as smut formed at the surface of the stainless steel sheet during the electrolytic etching treatment, and increases the ratio of the atomic concentration of Cr existing in chemical form other than metal to the atomic concentration of Fe existing in chemical form other than metal at the surface of the stainless steel sheet to stabilize the passive film at the surface of the stainless steel sheet.

Consequently, the contact resistance can be further reduced, and approximately as much contact resistance reduction effect as expected at the stage of the material steel sheet is maintained in the case of actually using the stainless steel sheet as a fuel cell separator.

We consider the reason for this to be the following.

A process of producing a fuel cell stack by connecting in series several tens to hundreds of fuel cell single cells assembled using fuel cell separators each obtained by press forming a material stainless steel sheet and optionally subjecting the stainless steel sheet to surface treatment and the like to improve corrosion resistance and conductivity (hereafter also referred to as "fuel cell stack production process") may involve heat treatment. During this heat treatment, the passive film at the surface of the stainless steel used as the separator grows thick, and, in some cases, grows thick to such an extent that it can be regarded substantially as an oxide layer. Hence, the conductivity of the steel sheet surface decreases from the conductivity at the stage of the material steel sheet, and the contact resistance increases.

This is considered to be the reason why, in the case where the stainless steel sheet according to each of the conventional techniques is actually used as a fuel cell separator, the contact resistance is not reduced as much as expected at the stage of the material steel sheet and desired power generation performance is not achieved in some cases.

In view of this, by increasing the ratio of the atomic concentration of Cr existing in chemical form other than metal to the atomic concentration of Fe existing in chemical form other than metal at the surface of the stainless steel sheet to stabilize the passive film at the surface of the stainless steel sheet, the growth of the passive film at the steel sheet surface can be suppressed even in the case where the stainless steel sheet is exposed to a heat treatment environment in the fuel cell stack production process. Consequently, approximately as much contact resistance reduction effect as expected at the stage of the material steel sheet can be achieved in the case of actually using the stainless steel sheet as a fuel cell separator.

Examples of the surface stabilizing treatment include immersion in an oxidizing solution and electrolysis in a potential range in which the stainless steel sheet is passivated.

Examples of the oxidizing solution include a nitric acid aqueous solution and a hydrogen peroxide aqueous solution. A longer immersion time facilitates the removal of smut and the like and the condensation of Cr at the surface. However, if the immersion time is excessively long, the effect is saturated and productivity decreases. Accordingly, the treatment time in the immersion is preferably 2 hr (120 min) or less. The treatment time in the immersion is more preferably 15 min or less. The treatment time in the immersion is preferably 0.5 min or more. The treatment time in the immersion is more preferably 1 min or more.

In the case of using a nitric acid aqueous solution, the concentration of nitric acid is preferably 10 g/L to 400 g/L. In the case of using a hydrogen peroxide aqueous solution, the concentration of hydrogen peroxide is preferably 10 g/L to 300 g/L. Allowable concentration of acids contained in each treatment solution as impurities is 10 g/L or less. No lower limit is placed on the concentration of acids contained in each treatment solution as impurities, and the concentration may be 0 g/L. Here, the concentration of hydrofluoric acid needs to be infinitesimal, specifically 1 g/L or less, in terms of safety during treatment and safety of disposal of waste liquid discharged after treatment.

The treatment temperature in the immersion is not limited, but is preferably 30° C. to 60° C.

In the electrolysis, the potential is adjusted to such a potential range in which the stainless steel sheet is passivated. In particular, it is preferable to adjust the potential to such a potential range in which components such as Fe and Ni other than Cr in the steel are dissolved and Cr is not dissolved.

The potential range (passive region) in which the stainless steel sheet is passivated differs depending on the treatment solution (electrolytic solution) used and the steel type of the stainless steel sheet. It is therefore preferable to adjust the potential for each treatment solution and each steel type of stainless steel. For example, in the case of using a 50 g/L nitric acid aqueous solution to treat steel sample ID A in Table 1, electrolysis is preferably performed in a potential range of +0.40 V to +0.80 V (vs. Ag/AgCl). A longer treatment time facilitates the condensation of Cr existing in chemical form other than metal at the steel sheet surface. However, if the treatment time is excessively long, the effect is saturated and productivity decreases. Accordingly, the electrolysis time is preferably 0.1 min or more and 2 hr (120 min) or less. The electrolysis time is more preferably 1 min or more. The electrolysis time is more preferably 15 min or less.

The treatment temperature in the electrolysis is not limited, but is preferably 30° C. to 70° C.

(5) Others

After the surface stabilizing treatment, a surface-coating layer may be formed at the surface of the stainless steel sheet.

The surface-coating layer formed is not limited, but it is preferable to use a material having excellent corrosion resistance and conductivity in a use environment of fuel cell separators. For example, a metal layer, an alloy layer, a metal oxide layer, a metal carbide layer, a metal nitride layer, a carbon material layer, a conductive polymer layer, an organic resin layer containing a conductive substance, or a mixed layer thereof is suitable.

Examples of the metal layer include metal layers of Au, Ag, Cu, Pt, Pd, W, Sn, Ti, Al, Zr, Nb, Ta, Ru, Ir, and Ni. A metal layer of Au or Pt is particularly suitable.

Examples of the alloy layer include Sn alloy layers of Ni—Sn ($Ni_3Sn_2$, $Ni_3Sn_4$), Cu—Sn ($Cu_3Sn$, $Cu_6Sn_5$), Fe—Sn (FeSn, $FeSn_2$), Sn—Ag, and Sn—Co and alloy layers of Ni—W, Ni—Cr, and Ti—Ta. An alloy layer of Ni—Sn or Fe—Sn is particularly suitable.

Examples of the metal oxide layer include metal oxide layers of $SnO_2$, $ZrO_2$, $TiO_2$, $WO_3$, $SiO_2$, $Al_2O_3$, $Nb_2O_5$, $IrO_2$, $RuO_2$, $PdO_2$, $Ta_2O_5$, $Mo_2O_5$, and $Cr_2O_3$. A metal oxide layer of $TiO_2$ or $SnO_2$ is particularly suitable.

Examples of the metal nitride layer and the metal carbide layer include metal nitride layers and metal carbide layers of TiN, CrN, TiCN, TiAlN, AlCrN, TiC, WC, SiC, $B_4C$, molybdenum nitride, CrC, TaC, and ZrN. A metal nitride layer of TiN is particularly suitable.

Examples of the carbon material layer include carbon material layers of graphite, amorphous carbon, diamond-like carbon, carbon black, fullerene, and carbon nanotube. A carbon material layer of graphite or diamond-like carbon is particularly suitable.

Examples of the conductive polymer layer include conductive polymer layers of polyaniline and polypyrrole.

The organic resin layer containing a conductive substance contains at least one conductive substance selected from a metal, an alloy, a metal oxide, a metal nitride, a metal carbide, a carbon material, and a conductive polymer included in the aforementioned metal layer, alloy layer, metal oxide layer, metal nitride layer, metal carbide layer, carbon material layer, and conductive polymer layer, and contains at least one organic resin selected from epoxy resin, phenol resin, polyamide-imide resin, polyester resin, polyphenylene sulfide resin, polyamide resin, urethane resin, acrylic resin, polyethylene resin, polypropylene resin, carbodiimide resin, phenol epoxy resin, and the like. As the organic resin layer containing a conductive substance, for example, graphite-dispersed phenol resin or carbon black-dispersed epoxy resin is suitable.

As the conductive substance, a metal and a carbon material (in particular, graphite, carbon black) are suitable. The content of the conductive substance is not limited, as long as predetermined conductivity is obtained in polymer electrolyte fuel cell separators.

Examples of the mixed layer include a mixed layer of TiN-dispersed Ni—Sn alloy.

With the surface-coating layer described above, the electric resistance at the interface between the stainless steel sheet as a substrate and the surface-coating layer can be reduced.

EXAMPLES

Example 1

Stainless steel sheets (bright annealed sheets) of 0.10 mm in sheet thickness having the chemical compositions listed in Table 1 (the balance consisting of Fe and inevitable impurities) were prepared, and subjected to cathodic electrolysis under the conditions listed in Table 2 to remove an oxide layer formed at the steel sheet surface. Following this, the stainless steel sheets were subjected to electrolytic etching treatment by potential control under the conditions listed in Table 2, and then subjected to immersion as surface stabilizing treatment under the conditions listed in Table 2, thus obtaining stainless steel sheets for separators. Each potential in Table 2 is potential relative to a reference electrode (V vs. Ag/AgCl).

Here, prior to the electrolytic etching treatment by potential control, an anodic polarization curve was acquired for each steel sample ID under the conditions of 55° C. and potential scanning rate: 1 mV/s in a 30 g/L sulfuric acid aqueous solution, using Ag/AgCl as the reference electrode. For steel sample ID A, the potential range from −0.51 V to −0.34 V (vs. Ag/AgCl) was determined to be the active region, and the potential range from more than −0.34 V to +0.97 V (vs. Ag/AgCl) was determined to be the passive region, and the potential range from more than +0.97 V (vs. Ag/AgCl) was determined to be the transpassive region. For steel sample ID B, the potential range from −0.49 V to −0.39 V (vs. Ag/AgCl) was determined to be the active region, the potential range from more than −0.39 V to +1.00 V (vs. Ag/AgCl) was determined to be the passive region, and the potential range from more than +1.00 V (vs. Ag/AgCl) was determined to be the transpassive region.

For steel sample ID C, the potential range from −0.25 V to −0.19 V (vs. Ag/AgCl) was determined to be the active region, the potential range from more than −0.19 V to +0.92 V (vs. Ag/AgCl) was determined to be the passive region, and the potential range from more than +0.92 V (vs. Ag/AgCl) was determined to be the transpassive region.

For steel sample ID D, the potential range from −0.34 V to −0.19 V (vs. Ag/AgCl) was determined to be the active region, the potential range from more than −0.19 V to +0.98 V (vs. Ag/AgCl) was determined to be the passive region, and the potential range from more than +0.98 V (vs. Ag/AgCl) was determined to be the transpassive region.

For steel sample ID E, the potential range from −0.35 V to −0.20 V (vs. Ag/AgCl) was determined to be the active region, the potential range from more than −0.20 V to +0.96 V (vs. Ag/AgCl) was determined to be the passive region, and the potential range from more than +0.96 V (vs. Ag/AgCl) was determined to be the transpassive region.

The immersion after the electrolytic etching treatment was performed under the conditions of treatment temperature: 55° C. in a 300 g/L nitric acid aqueous solution for 5 min or 15 min.

The contact resistance of each resultant stainless steel sheet for separators was evaluated as follows.

A sample of each stainless steel sheet for separators was sandwiched between sheets of carbon paper (TGP-H-120 produced by Toray Industries, Inc.), and further contacted from both sides by Au plated Cu electrodes. A pressure of 0.98 MPa (=10 kg/cm$^2$) per unit area was applied to cause current to flow, and the voltage difference between the electrodes was measured to calculate the electric resistance. The value obtained by multiplying the measured electric resistance by the area of the contact surface was taken to be the contact resistance value.

Moreover, each stainless steel sheet for separators was subjected to heat treatment of holding in an air atmosphere at 200° C. for 2 hr, assuming heat treatment that may be performed in a fuel cell stack production process. The contact resistance value of the stainless steel sheet after the heat treatment was calculated in the same way as above. The contact resistance of each stainless steel sheet for separators was evaluated based on the following criteria. The evaluation results are listed in Table 2.

In the case where the contact resistance value before the heat treatment was 20.0 mΩ·cm$^2$ or less, it was determined that low contact resistance was obtained.

In the case where the contact resistance value after the heat treatment was 30.0 mΩ·cm$^2$ or less, it was determined that low contact resistance was maintained even after the heat treatment.

For samples that failed to have low contact resistance before the heat treatment, the evaluation of the contact resistance after the heat treatment was omitted.

TABLE 1

| Steel sample | Chemical composition (mass %) | | | | | | | | | | | |
|---|---|---|---|---|---|---|---|---|---|---|---|---|
| ID | C | Si | Mn | P | S | Cr | Al | N | Ni | Cu | Mo | Others |
| A | 0.009 | 0.14 | 0.18 | 0.027 | 0.002 | 20.8 | 0.033 | 0.009 | 0.21 | 0.43 | — | Ti: 0.29 |
| B | 0.005 | 0.18 | 0.16 | 0.026 | 0.007 | 30.3 | 0.079 | 0.012 | 0.22 | — | 1.80 | Nb: 0.14 |
| C | 0.018 | 0.68 | 1.01 | 0.040 | 0.004 | 17.8 | 0.002 | 0.027 | 12.04 | 0.44 | 2.05 | — |

TABLE 1-continued

| Steel sample ID | Chemical composition (mass %) | | | | | | | | | | | |
|---|---|---|---|---|---|---|---|---|---|---|---|---|
| | C | Si | Mn | P | S | Cr | Al | N | Ni | Cu | Mo | Others |
| D | 0.057 | 0.41 | 1.10 | 0.029 | 0.002 | 18.1 | 0.001 | 0.037 | 8.02 | 0.24 | 0.15 | — |
| E | 0.017 | 0.52 | 0.96 | 0.026 | 0.003 | 18.4 | 0.002 | 0.029 | 10.23 | 0.21 | 0.13 | Zr: 0.05 |

TABLE 2

| | | Production conditions | | | | | | |
|---|---|---|---|---|---|---|---|---|
| | | Oxide layer removal treatment | | | | Electrolytic etching treatment | | |
| Sample No. | Steel sample ID | Treatment solution | Treatment temperature (° C.) | Potential (V vs Ag/AgCl) | Treatment time (sec) | Treatment solution | Treatment temperature (° C.) | Potential (V vs Ag/AgCl) | Treatment time (sec) |
| 1 | A | 30 g/L sulfuric acid aqueous solution | 55 | −0.70 | 60 | 30 g/L sulfuric acid aqueous solution | 55 | −0.40 | 60 |
| 2 | | 30 g/L sulfuric acid aqueous solution | 55 | −0.70 | 60 | 30 g/L sulfuric acid aqueous solution | 55 | +1.30 | 90 |
| 3 | B | 30 g/L sulfuric acid aqueous solution | 55 | −0.70 | 60 | 30 g/L sulfuric acid aqueous solution | 55 | −0.40 | 60 |
| 4 | | 30 g/L sulfuric acid aqueous solution | 55 | −0.70 | 60 | 30 g/L sulfuric acid aqueous solution | 55 | +0.30 | 60 |
| 5 | | 30 g/L sulfuric acid aqueous solution | 55 | −0.70 | 60 | 30 g/L sulfuric acid aqueous solution | 55 | +1.30 | 60 |
| 6 | C | 30 g/L sulfuric acid aqueous solution | 55 | −0.70 | 60 | 30 g/L sulfuric acid aqueous solution | 55 | −0.20 | 60 |
| 7 | D | 30 g/L sulfuric acid aqueous solution | 55 | −0.70 | 60 | 30 g/L sulfuric acid aqueous solution | 55 | −0.20 | 60 |
| 8 | E | 30 g/L sulfuric acid aqueous solution | 55 | −0.70 | 60 | 30 g/L sulfuric acid aqueous solution | 55 | −0.28 | 60 |

| | | Production conditions | | | Evaluation results | | |
|---|---|---|---|---|---|---|---|
| | | Electrolytic etching | Surface stabilizing treatment | | Before heat treatment | After heat treatment | |
| Sample No. | Steel sample ID | treatment Electrolytic potential | Treatment method | Treatment time (min) | Contact resistance value (mΩ · cm$^2$) | Contact resistance value (mΩ · cm$^2$) | Remarks |
| 1 | A | Active region | Immersion | 15 | 12.6 | 18.6 | Example |
| 2 | | Transpassive region | Immersion | 15 | 37.4 | — | Comparative Example |
| 3 | B | Active region | Immersion | 15 | 13.6 | 19.7 | Example |

TABLE 2-continued

| | | | | | | | |
|---|---|---|---|---|---|---|---|
| 4 | | Passive region | Immersion | 15 | 347.1 | — | Comparative Example |
| 5 | | Transpassive region | Immersion | 5 | 26.8 | — | Comparative Example |
| 6 | C | Active region | Immersion | 15 | 16.5 | 28.1 | Example |
| 7 | D | Active region | Immersion | 5 | 15.7 | 29.6 | Example |
| 8 | E | Active region | Immersion | 5 | 16.3 | 27.9 | Example |

The results in Table 2 reveal the following points.

(a) All Examples had desired low contact resistance. In particular, in the case of performing the stabilizing treatment after the electrolytic etching treatment, low contact resistance was maintained even after the heat treatment. These steel sheets can be produced without using hydrofluoric acid, and therefore are very advantageous in terms of safety and mass productivity.

(b) All Comparative Examples failed to have desired contact resistance at the stage before the heat treatment.

Example 2

Stainless steel sheets (bright annealed sheets) of 0.10 mm in sheet thickness having the chemical compositions listed in Table 1 (the balance consisting of Fe and inevitable impurities) were prepared, and subjected to cathodic electrolysis under the conditions listed in Tables 3 and 4 to remove an oxide layer formed at the steel sheet surface. Following this, the stainless steel sheets were subjected to electrolytic etching treatment by current control under the conditions listed in Tables 3 and 4, and then subjected to immersion or electrolysis as surface stabilizing treatment under the conditions listed in Tables 3 and 4, thus obtaining stainless steel sheets for separators (the "current density" in Tables 3 and 4 denotes a value obtained by dividing the current flowing between the stainless steel sheet as the material to be treated and the counter electrode by the surface area of the material to be treated). Sample No. 18 was not subjected to the cathodic electrolysis as the oxide layer removal treatment. Samples No. 19, No. 28, and No. 35 were not subjected to the immersion or electrolysis as the surface stabilizing treatment.

Here, prior to the electrolytic etching treatment by current control, the relationship between the current density and the electrolytic voltage applied between the stainless steel sheet as the material to be treated and the counter electrode was studied for each steel sample ID under the conditions of 55° C. in a 30 g/L sulfuric acid aqueous solution. From the range in which the electrolytic voltage increased rapidly, the following were determined: For steel sample ID A, current density adjusted to a range of +0.5 mA/cm$^2$ to +7.5 mA/cm$^2$ corresponds to the active region. For steel sample ID B, current density adjusted to a range of +0.03 mA/cm$^2$ to +0.3 mA/cm$^2$ corresponds to the active region. For steel sample ID C, current density adjusted to a range of +0.03 mA/cm$^2$ to +0.3 mA/cm$^2$ corresponds to the active region. For steel sample IDs D and E, current density adjusted to +0.03 mA/cm$^2$ corresponds to the active region.

Moreover, the following were determined: For steel sample ID A, current density of +15.0 mA/cm$^2$ or more corresponds to the transpassive region. For steel sample ID B, current density of +7.5 mA/cm$^2$ or more corresponds to the transpassive region. For steel sample ID C, current density of +15.0A/cm$^2$ or more corresponds to the transpassive region. For steel sample ID D, current density of +15.0 mA/cm$^2$ or more corresponds to the transpassive region. For steel sample ID E, current density of +15.0 mA/cm$^2$ or more corresponds to the transpassive region.

Furthermore, the following were determined: For steel sample ID A, current density adjusted to +0.8 mA/cm$^2$ under the conditions of 55° C. in a 30 g/L hydrochloric acid aqueous solution corresponds to the active region, and current density adjusted to +1.0 mA/cm$^2$ under each of the conditions of 55° C. in a mixed aqueous solution of 15 g/L sulfuric acid +15 g/L hydrochloric acid, the conditions of 55° C. in a 30 g/L sulfuric acid +0.5 g/L hydrofluoric acid aqueous solution, and the conditions of 55° C. in a 30 g/L sulfuric acid +1 g/L nitric acid aqueous solution corresponds to the active region.

For steel sample ID B, current density adjusted to +0.03 mA/cm$^2$ under each of the conditions of 65° C. in a 30 g/L sulfuric acid aqueous solution, the conditions of 70° C. in a 30 g/L sulfuric acid aqueous solution, and the conditions of 70° C. in a 30 g/L hydrochloric acid aqueous solution corresponds to the active region.

For steel sample ID D, current density adjusted to +0.03 mA/cm$^2$ under each of the conditions of 70° C. in a 30 g/L sulfuric acid aqueous solution and the conditions of 75° C. in a 30 g/L sulfuric acid aqueous solution corresponds to the active region.

The immersion after the electrolytic etching treatment was performed under the conditions of treatment temperature: 55° C. in a 300 g/L nitric acid aqueous solution for 0.5 min, 1 min, 5 min, 15 min, or 30 min.

The electrolysis after the electrolytic etching treatment was performed under the conditions of treatment temperature: 55° C., potential: +0.50 V (vs. Ag/AgCl), and treatment time: 5 min using a 50 g/L nitric acid aqueous solution. For each stainless steel sheet of steel sample ID A, a potential of +0.50 V (vs. Ag/AgCl) was in the passive region.

The contact resistance of each resultant stainless steel sheet for separators was evaluated in the same way as in Example 1. The evaluation results are listed in Tables 3 and 4.

TABLE 3

| | | Production conditions | | | | | | | |
|---|---|---|---|---|---|---|---|---|---|
| | | Oxide layer removal treatment | | | | Electrolytic etching treatment | | | |
| Sample No. | Steel sample ID | Treatment solution | Treatment temperature (° C.) | Current density (mA/cm²) | Treatment time (sec) | Treatment solution | Treatment temperature (° C.) | Current density (mA/cm²) | Treatment time (sec) | Electrolytic potential |
| 11 | A | 30 g/L sulfuric acid aqueous solution | 55 | −7.5 | 90 | 30 g/L sulfuric acid aqueous solution | 55 | +7.5 | 90 | Active region |
| 12 | | 30 g/L sulfuric acid aqueous solution | 55 | −7.5 | 60 | 30 g/L sulfuric acid aqueous solution | 55 | +7.5 | 60 | Active region |
| 13 | | 30 g/L sulfuric acid aqueous solution | 55 | −7.5 | 30 | 30 g/L sulfuric acid aqueous solution | 55 | +7.5 | 30 | Active region |
| 14 | | 30 g/L sulfuric acid aqueous solution | 55 | −5.0 | 24 | 30 g/L sulfuric acid aqueous solution | 55 | +5.0 | 24 | Active region |
| 24 | | 30 g/L sulfuric acid aqueous solution | 55 | −1.0 | 30 | 30 g/L sulfuric acid aqueous solution | 55 | +1.0 | 30 | Active region |
| 15 | | 30 g/L sulfuric acid aqueous solution | 55 | −1.0 | 60 | 30 g/L sulfuric acid aqueous solution | 55 | +1.0 | 60 | Active region |
| 16 | | 30 g/L sulfuric acid aqueous solution | 55 | −1.0 | 60 | 30 g/L sulfuric acid aqueous solution | 55 | +1.0 | 60 | Active region |
| 25 | | 30 g/L sulfuric acid aqueous solution | 55 | −0.8 | 60 | 30 g/L sulfuric acid aqueous solution | 55 | +0.8 | 60 | Active region |
| 26 | | 30 g/L sulfuric acid aqueous solution | 55 | −0.8 | 60 | 30 g/L sulfuric acid aqueous solution | 55 | +0.8 | 60 | Active region |
| 27 | | 30 g/L sulfuric acid aqueous solution | 55 | −0.5 | 30 | 30 g/L sulfuric acid aqueous solution | 55 | +0.5 | 30 | Active region |
| 17 | | 30 g/L sulfuric acid aqueous solution | 55 | −0.5 | 60 | 30 g/L sulfuric acid aqueous solution | 55 | +0.5 | 60 | Active region |
| 18 | | — | | | | 30 g/L sulfuric acid aqueous solution | 55 | +7.5 | 60 | Active region |
| 28 | | 30 g/L sulfuric acid aqueous solution | 55 | −1.0 | 30 | 30 g/L sulfuric acid aqueous solution | 55 | +1.0 | 30 | Active region |
| 19 | | 30 g/L sulfuric acid aqueous solution | 55 | −7.5 | 60 | 30 g/L sulfuric acid aqueous solution | 55 | +7.5 | 60 | Active region |
| 20 | | 30 g/L sulfuric acid aqueous solution | 55 | −15.0 | 60 | 30 g/L sulfuric acid aqueous solution | 55 | +15.0 | 60 | Transpassive region |
| 29 | | 30 g/L hydrochloric acid aqueous solution | 55 | −0.8 | 60 | 30 g/L hydrochloric acid aqueous solution | 55 | +0.8 | 60 | Active region |
| 30 | | 15 g/L sulfuric acid + 15 g/L hydrochloric acid aqueous solution | 55 | −1.0 | 60 | 15 g/L sulfuric acid + 15 g/L hydrochloric acid aqueous solution | 55 | +1.0 | 60 | Active region |

TABLE 3-continued

| | | | | | | | | | |
|---|---|---|---|---|---|---|---|---|---|
| 31 | 30 g/L sulfuric acid + 0.5 g/L hydrofluoric acid aqueous solution | 55 | −1.0 | 60 | 30 g/L sulfuric acid + 0.5 g/L hydrofluoric acid aqueous solution | 55 | +1.0 | 60 | Active region |
| 32 | 30 g/L sulfuric acid + 1 g/L nitric acid aqueous solution | 55 | −1.0 | 60 | 30 g/L sulfuric acid + 1 g/L nitric acid aqueous solution | 55 | +1.0 | 60 | Active region |

| | | Production conditions Surface stabilizing treatment | | Evaluation results | | |
|---|---|---|---|---|---|---|
| | | | | Before heat treatment Contact | After heat treatment Contact | |
| Sample No. | Steel sample ID | Treatment method | Treatment time (min) | resistance value (mΩ · cm²) | resistance value (mΩ · cm²) | Remarks |
| 11 | A | Electrolysis | 5 | 12.9 | 20.3 | Example |
| 12 | | Immersion | 15 | 13.0 | 19.7 | Example |
| 13 | | Immersion | 15 | 13.0 | 19.1 | Example |
| 14 | | Immersion | 15 | 12.9 | 19.0 | Example |
| 24 | | Immersion | 15 | 12.3 | 16.3 | Example |
| 15 | | Immersion | 15 | 10.8 | 15.6 | Example |
| 16 | | Immersion | 30 | 10.9 | 15.0 | Example |
| 25 | | Immersion | 1 | 11.4 | 18.7 | Example |
| 26 | | Immersion | 5 | 11.3 | 16.3 | Example |
| 27 | | Immersion | 15 | 12.8 | 16.9 | Example |
| 17 | | Immersion | 15 | 11.4 | 15.0 | Example |
| 18 | | Immersion | 15 | 27.5 | — | Comparative Example |
| 28 | | | — | 16.3 | 31.1 | Example |
| 19 | | | — | 19.6 | 34.6 | Example |
| 20 | | Immersion | 15 | 35.2 | — | Comparative Example |
| 29 | | Immersion | 15 | 11.8 | 17.0 | Example |
| 30 | | Immersion | 15 | 11.2 | 15.9 | Example |
| 31 | | Immersion | 15 | 11.0 | 15.7 | Example |
| 32 | | Immersion | 15 | 10.5 | 15.3 | Example |

TABLE 4

| | | Production conditions | | | | | | | |
|---|---|---|---|---|---|---|---|---|---|
| | | Oxide layer removal treatment | | | | Electrolytic etching treatment | | | |
| Sample No. | Steel sample ID | Treatment solution | Treatment temperature (° C.) | Current density (mA/cm²) | Treatment time (sec) | Treatment solution | Treatment temperature (° C.) | Current density (mA/cm²) | Treatment time (sec) |
| 21 | B | 30 g/L sulfuric acid aqueous solution | 55 | −7.5 | 60 | 30 g/L sulfuric acid aqueous solution | 55 | +0.3 | 60 |
| 33 | | 30 g/L sulfuric acid aqueous solution | 55 | −7.5 | 60 | 30 g/L sulfuric acid aqueous solution | 55 | +0.3 | 90 |
| 22 | | 30 g/L sulfuric acid aqueous solution | 55 | −7.5 | 60 | 30 g/L sulfuric acid aqueous solution | 55 | +0.03 | 60 |
| 34 | | 30 g/L sulfuric acid aqueous solution | 55 | −7.5 | 60 | 30 g/L sulfuric acid aqueous solution | 55 | +0.03 | 90 |
| 23 | | 30 g/L sulfuric acid aqueous solution | 55 | −7.5 | 60 | 30 g/L sulfuric acid aqueous solution | 55 | +7.5 | 60 |

TABLE 4-continued

| Sample No. | Steel sample ID | Electrolytic etching (solution) | (col) | (col) | (col) | Electrolytic etching (solution) | (col) | (col) | (col) |
|---|---|---|---|---|---|---|---|---|---|
| 35 | | 30 g/L sulfuric acid aqueous solution | 55 | −7.5 | 90 | 30 g/L sulfuric acid aqueous solution | 55 | +0.03 | 90 |
| 36 | | 30 g/L sulfuric acid aqueous solution | 65 | −7.5 | 90 | 30 g/L sulfuric acid aqueous solution | 65 | +0.03 | 90 |
| 37 | | 30 g/L sulfuric acid aqueous solution | 65 | −7.5 | 60 | 30 g/L sulfuric acid aqueous solution | 65 | +0.03 | 60 |
| 38 | | 30 g/L sulfuric acid aqueous solution | 65 | −7.5 | 60 | 30 g/L sulfuric acid aqueous solution | 65 | +0.03 | 60 |
| 39 | | 30 g/L sulfuric acid aqueous solution | 70 | −1.0 | 90 | 30 g/L sulfuric acid aqueous solution | 70 | +0.03 | 90 |
| 40 | | 30 g/L hydrochloric acid aqueous solution | 70 | −1.0 | 90 | 30 g/L hydrochloric acid aqueous solution | 70 | +0.03 | 90 |
| 41 | C | 30 g/L sulfuric acid aqueous solution | 55 | −7.5 | 60 | 30 g/L sulfuric acid aqueous solution | 55 | +0.13 | 60 |
| 42 | | 30 g/L sulfuric acid aqueous solution | 55 | −7.5 | 60 | 30 g/L sulfuric acid aqueous solution | 55 | +0.13 | 60 |
| 46 | D | 30 g/L sulfuric acid aqueous solution | 55 | −1.0 | 120 | 30 g/L sulfuric acid aqueous solution | 55 | +0.03 | 120 |
| 43 | | 30 g/L sulfuric acid aqueous solution | 70 | −1.0 | 90 | 30 g/L sulfuric acid aqueous solution | 70 | +0.03 | 90 |
| 44 | | 30 g/L sulfuric acid aqueous solution | 75 | −7.5 | 90 | 30 g/L sulfuric acid aqueous solution | 75 | +0.03 | 90 |
| 45 | | 30 g/L sulfuric acid aqueous solution | 75 | −7.5 | 90 | 30 g/L sulfuric acid aqueous solution | 75 | +0.03 | 90 |
| 47 | E | 30 g/L sulfuric acid aqueous solution | 55 | −1.0 | 120 | 30 g/L sulfuric acid aqueous solution | 55 | +0.03 | 120 |

| | | Production conditions | | | Evaluation results | | |
|---|---|---|---|---|---|---|---|
| | | Electrolytic etching | Surface stabilizing treatment | | Before heat treatment Contact resistance value (mΩ·cm²) | After heat treatment Contact resistance value (mΩ·cm²) | |
| Sample No. | Steel sample ID | treatment Electrolytic potential | Treatment method | Treatment time (min) | | | Remarks |
| 21 | B | Active region | Immersion | 15 | 15.6 | 23.1 | Example |
| 33 | | Active region | Immersion | 15 | 13.6 | 19.6 | Example |
| 22 | | Active region | Immersion | 15 | 16.0 | 24.3 | Example |
| 34 | | Active region | Immersion | 15 | 14.6 | 21.2 | Example |
| 23 | | Transpassive region | Immersion | 15 | 27.0 | — | Comparative Example |
| 35 | | Active region | — | — | 19.7 | 35.1 | Example |
| 36 | | Active region | Immersion | 0.5 | 12.2 | 22.5 | Example |

TABLE 4-continued

| | | | | | | | |
|---|---|---|---|---|---|---|---|
| 37 | | Active region | Immersion | 1 | 12.5 | 20.8 | Example |
| 38 | | Active region | Immersion | 5 | 12.4 | 18.7 | Example |
| 39 | | Active region | Immersion | 1 | 11.8 | 19.6 | Example |
| 40 | | Active region | Immersion | 15 | 13.5 | 17.1 | Example |
| 41 | C | Active region | Immersion | 15 | 17.0 | 28.4 | Example |
| 42 | | Active region | Immersion | 15 | 17.4 | 29.1 | Example |
| 46 | D | Active region | Immersion | 15 | 17.3 | 28.9 | Example |
| 43 | | Active region | Immersion | 1 | 14.9 | 29.5 | Example |
| 44 | | Active region | Immersion | 1 | 14.5 | 29.3 | Example |
| 45 | | Active region | Immersion | 5 | 14.1 | 28.7 | Example |
| 47 | E | Active region | Immersion | 15 | 17.7 | 29.7 | Example |

The results in Tables 3 and 4 reveal the following points.

(a) All Examples had desired low contact resistance. In particular, in the case of performing appropriate stabilizing treatment, low contact resistance was maintained even after the heat treatment. These steel sheets can be produced without using hydrofluoric acid, and therefore are very advantageous in terms of safety and mass productivity.

(b) All Comparative Examples failed to have desired contact resistance at the stage before the heat treatment.

The invention claimed is:

1. A production method for a stainless steel sheet for fuel cell separators, the production method comprising:
preparing a stainless steel sheet as a material;
thereafter removing an oxide layer at a surface of the stainless steel sheet; and
thereafter subjecting the stainless steel sheet to electrolytic etching treatment in an active region of the stainless steel sheet wherein the active region is defined as a potential range that, in an anodic polarization curve obtained when polarizing a stainless steel sheet in a treatment solution in an anodic direction from a natural immersion potential at a scanning rate of 1 mV/s, appears first with potential increase and in which the current density increases as the potential increases and reaches a local maximum value and then decreases to less than or equal to 1/100 of the local maximum value, and wherein in the case of austenitic stainless steel, the active region is defined as a potential range until the current density decreases to less than or equal to 1/2 of the local maximum value.

2. The production method for a stainless steel sheet for fuel cell separators according to claim 1, wherein the oxide layer at the surface of the stainless steel sheet is removed by electrolysis.

3. The production method for a stainless steel sheet for fuel cell separators according to claim 2, wherein the electrolysis is cathodic electrolysis.

4. The production method for a stainless steel sheet for fuel cell separators according to claim 1, comprising
subjecting the stainless steel sheet to surface stabilizing treatment, after the electrolytic etching treatment.

5. The production method for a stainless steel sheet for fuel cell separators according to claim 4, wherein the surface stabilizing treatment is immersion in an oxidizing solution or electrolysis in a passive region of the stainless steel sheet.

6. The production method for a stainless steel sheet for fuel cell separators according to claim 1, wherein a treatment solution used in the electrolytic etching treatment is a sulfuric acid aqueous solution, a hydrochloric acid aqueous solution, or a mixed aqueous solution of sulfuric acid and hydrochloric acid.

7. The production method for a stainless steel sheet for fuel cell separators according to claim 2, comprising
subjecting the stainless steel sheet to surface stabilizing treatment, after the electrolytic etching treatment.

8. The production method for a stainless steel sheet for fuel cell separators according to claim 3, comprising
subjecting the stainless steel sheet to surface stabilizing treatment, after the electrolytic etching treatment.

9. The production method for a stainless steel sheet for fuel cell separators according to claim 7, wherein the surface stabilizing treatment is immersion in an oxidizing solution or electrolysis in a passive region of the stainless steel sheet.

10. The production method for a stainless steel sheet for fuel cell separators according to claim 8, wherein the surface stabilizing treatment is immersion in an oxidizing solution or electrolysis in a passive region of the stainless steel sheet.

11. The production method for a stainless steel sheet for fuel cell separators according to claim 2, wherein a treatment solution used in the electrolytic etching treatment is a sulfuric acid aqueous solution, a hydrochloric acid aqueous solution, or a mixed aqueous solution of sulfuric acid and hydrochloric acid.

12. The production method for a stainless steel sheet for fuel cell separators according to claim 3, wherein a treatment solution used in the electrolytic etching treatment is a sulfuric acid aqueous solution, a hydrochloric acid aqueous solution, or a mixed aqueous solution of sulfuric acid and hydrochloric acid.

13. The production method for a stainless steel sheet for fuel cell separators according to claim 4, wherein a treatment solution used in the electrolytic etching treatment is a sulfuric acid aqueous solution, a hydrochloric acid aqueous solution, or a mixed aqueous solution of sulfuric acid and hydrochloric acid.

14. The production method for a stainless steel sheet for fuel cell separators according to claim 5, wherein a treatment solution used in the electrolytic etching treatment is a sulfuric acid aqueous solution, a hydrochloric acid aqueous solution, or a mixed aqueous solution of sulfuric acid and hydrochloric acid.

15. The production method for a stainless steel sheet for fuel cell separators according to claim 7, wherein a treatment solution used in the electrolytic etching treatment is a sulfuric acid aqueous solution, a hydrochloric acid aqueous solution, or a mixed aqueous solution of sulfuric acid and hydrochloric acid.

16. The production method for a stainless steel sheet for fuel cell separators according to claim 8, wherein a treatment solution used in the electrolytic etching treatment is a sulfuric acid aqueous solution, a hydrochloric acid aqueous solution, or a mixed aqueous solution of sulfuric acid and hydrochloric acid.

17. The production method for a stainless steel sheet for fuel cell separators according to claim 9, wherein a treatment solution used in the electrolytic etching treatment is a sulfuric acid aqueous solution, a hydrochloric acid aqueous solution, or a mixed aqueous solution of sulfuric acid and hydrochloric acid.

18. The production method for a stainless steel sheet for fuel cell separators according to claim 10, wherein a treatment solution used in the electrolytic etching treatment is a sulfuric acid aqueous solution, a hydrochloric acid aqueous solution, or a mixed aqueous solution of sulfuric acid and hydrochloric acid.

* * * * *